(12) United States Patent
Loboz et al.

(10) Patent No.: US 7,627,587 B2
(45) Date of Patent: Dec. 1, 2009

(54) SYSTEM AND METHOD FOR IMPROVING INFORMATION RETRIEVAL FROM A DATABASE

(75) Inventors: Charles Zdzislaw Loboz, West Ryde (AU); Niels Gebauer, Cremorne Point (AU); Jonatan Kelu, Granville (AU)

(73) Assignee: Unisys Corporation, Blue Bell, PA (US)

( * ) Notice: Subject to any disclaimer, the term of this patent is extended or adjusted under 35 U.S.C. 154(b) by 445 days.

(21) Appl. No.: 10/671,359

(22) Filed: Sep. 25, 2003

(65) Prior Publication Data

US 2009/0164410 A1 Jun. 25, 2009

(51) Int. Cl.
*G06F 17/00* (2006.01)
(52) U.S. Cl. .......................... 707/101; 707/1
(58) Field of Classification Search ................. 707/100, 707/1, 2, 101; 702/186, 189; 365/189.04; 711/173
See application file for complete search history.

(56) References Cited

U.S. PATENT DOCUMENTS

| 6,052,694 | A | * | 4/2000 | Bromberg | 707/200 |
|---|---|---|---|---|---|
| 6,061,689 | A | * | 5/2000 | Chang et al. | 707/103 R |
| 6,088,767 | A | * | 7/2000 | Dan et al. | 711/129 |
| 6,192,357 | B1 | * | 2/2001 | Krychniak | 707/2 |
| 6,681,309 | B2 | * | 1/2004 | Szendy et al. | 711/173 |
| 6,708,161 | B2 | * | 3/2004 | Tenorio et al. | 707/2 |
| 6,859,758 | B1 | * | 2/2005 | Prabhakaran et al. | 702/186 |
| 2003/0217078 | A1 | * | 11/2003 | Carlson et al. | 707/200 |
| 2003/0233382 | A1 | * | 12/2003 | Gemba et al. | 707/201 |
| 2004/0064456 | A1 | * | 4/2004 | Fong et al. | 707/100 |
| 2004/0267553 | A1 | * | 12/2004 | Brunton | 705/1 |

\* cited by examiner

*Primary Examiner*—John R. Cottingham
*Assistant Examiner*—Robert Timblin
(74) *Attorney, Agent, or Firm*—Phuong-Quan Hoang; Robert P. Marley

(57) ABSTRACT

The present invention relates to a method and system for improving information retrieval from a database. In one aspect, the invention provides a method for implementing a database. The method includes the steps of providing at least one set of linked entities which contain a plurality of entities, and each said entity is arranged to store at least one data value, further providing an additional entity for at least one set of linked entities, and storing in the additional entity the aggregation of a plurality of data values contained in the at least one set of linked entities.

3 Claims, 2 Drawing Sheets

SYSTEM AND METHOD FOR IMPROVING INFORMATION RETRIEVAL FROM A DATABASE

FIELD OF THE INVENTION

The present invention relates to a system and method for improving information retrieval from a database, and particularly, but not exclusively, to a method of improving the retrieval of deeply nested entities in a database.

BACKGROUND OF THE INVENTION

Data in a computing system is kept in a structured format, such as a database. A database may generically be defined as a volume of related data, (of varying types and lengths), which is kept in a defined, structured format. Generally, a database structure may be composed of a number of "entities", each entity being arranged to hold a set of data values. Each entity commonly has a specific purpose, and is arranged to hold a specific type of data value. A computer operator who implements a database may wish to define a number of different types of entities in the database. In one example, a database may include an entity entitled "CUSTOMER". The entity CUSTOMER may contain further entities. That is, an entity may reside within another entity. For example, the entity CUSTOMER may include entities entitled "CHILDREN", "ADDRESSES" and "PHONENUMBERS". The process of defining entities within entities is commonly termed "nesting", since the entities CHILDREN, ADDRESSES and PHONENUMBERS exist (or "nest") within the larger entity entitled CUSTOMER.

The description given above pertains to the theoretical structure of a database. While a database may be modelled as a set of nested entities in theory, in practice (e.g. on a hard drive in a computing system) the database is implemented as a set of tables with links between related elements of each table. These links serve the purpose of recreating the theoretical nesting structure. The process of taking a conceptual database structure and recreating the structure into a database on a computing system is termed "mapping".

The computer operator designs a database as a set of nested entities, which subsequently needs to be mapped into a database. The conceptual or abstract design of a database is generally referred to as a database schema. That is, the term "database schema" refers to the organisational structure of the database. The term mapping refers to the structure of the database as it is implemented in "real life".

In practice, databases are generally arranged in the form of a set of tables, each table being arranged to hold a set of data. In one particular embodiment, termed a "relational" database, elements in one table are linked to elements in another table. As the term implies, a relational database has links that tie together data. For example, if each customer has one address and phone number, then the data stored in the entity CUSTOMER may be stored in one database table. However, where a customer has more than one address and/or phone number, it is more efficient to hold the data values for ADDRESS in an ADDRESS table and the data values for PHONENUMBERS in a PHONENUMBER table. The ADDRESS and PHONENUMBER tables then contain appropriate links to the CUSTOMER table, such that an operator may traverse the tables in a logical manner, to find the appropriate data value in the table.

The mapping of a nested entity into a relational database results in a computer performance overhead, since, for deeply nested entities, it would be necessary to access many tables before the data value element would be retrieved.

In the normal course of running a database access application, the data in the tables will be queried to retrieve values held in the database. Database queries are also known as "read" operations. (i.e. these operations do not alter the database, they merely retrieve information from the database).

At various times, new entries will be added to a table, existing entries will be updated, and entries that are no longer needed will be deleted. These operations are collectively called "write" operations, as they modify the state of the database (i.e. they modify either the structure of the database, or the information contained within the database).

Read operations are generally much more common than write operations because it is usual to write data to the database once, and subsequently read the data many times.

When a user wishes to retrieve information from the database, it is often necessary for the database access application to traverse a number of tables before arriving at the required data value or set of data values. The aforementioned operation is known in the art as a "join" operation, as the database access application joins the data requested by the query from several disparate tables into one final result.

A join operation is generally computationally expensive. The sequence of lookups needed to complete a join operation, as outlined above, take a longer read time to complete than a single table lookup. Furthermore, deeply-nested relationships typically have very long read times since many join operations must be performed.

SUMMARY OF THE INVENTION

In a first aspect, the present invention provides a method for implementing a database, comprising the steps of,
  providing at least one set of linked entities, wherein the at least one set of linked entities contains a plurality of entities and each said entity is arranged to store at least one data value;
  providing an additional entity for at least one set of linked entities; and
  storing, in the additional entity, the aggregation of a plurality of data values contained in the at least one set of linked entities.

In a second aspect, the present invention provides a method for modifying a database having at least one set of linked entities, wherein the at least one set of linked entities contains a plurality of entities and each said entity is arranged to store at least one data value, the method comprising the steps of,
  providing an additional entity for at least one set of linked entities, and
  storing in the additional entity the aggregation of a plurality of data values contained in the at least one set of linked entities.

In a third aspect, the present invention provides a method for reading from a database, the database comprising
  at least one set of linked entities, wherein the at least one set of linked entities contains a plurality of entities and each said entity is arranged to store at least one data value, and
  an additional entity for the at least one set of linked entities, the additional entity comprising the aggregation of a plurality of data values stored in the at least one set of linked entities, whereby the plurality of data values contained within the at least one set of linked entities may be obtained by performing a read operation on the additional entity.

The present invention advantageously provides a method of arranging a database such that the total time taken to "read" a data value from the database is reduced, when compared to a conventional database.

The present invention advantageously reduces the length of time taken to read a value from the database by creating an additional table that aggregates all of the pertinent information about an entity. This is achieved by providing an additional entity, the additional entity (table) being arranged to store the aggregation of the set of linked entities.

In a fourth aspect, the present invention provides a system for reading from a database, comprising a database arranged to contain at least one set of linked entities, wherein the at least one set of linked entities contains at least one entity and each at least one entity is arranged to store at least one data value, means for providing an additional entity for the at least one set of linked entities, the additional entity comprising the aggregation of all data values stored in the at least one set of linked entities, and reading means arranged to read all data values contained within the at least one set of linked entities by performing a read operation on the additional entity.

In a fifth aspect, the present invention provides a system for implementing a database, comprising, means for providing at least one set of linked entities, wherein the at least one set of linked entities contains a plurality of entities and each said entity is arranged to store at least one data value;

means for providing an additional entity for at least one set of linked entities; and storing means arranged to store, in the additional entity, the aggregation of a plurality of data values contained in the at least one set of linked entities.

In a sixth aspect, the present invention provides a system for modifying a database having at least one set of linked entities, wherein the at least one set of linked entities contains a plurality of entities and each said entity is arranged to store at least one data value, comprising, means for providing an additional entity for at least one set of linked entities, and storing means arranged to store, in the additional entity, the aggregation of a plurality of data values contained in the at least one set of linked entities.

It is quite common for data values to be written to a database only a small number of times, but read from the database a large number of times. For example, if a new CUSTOMER entry is added to the database, it will only be written to the database once. It may be updated occasionally (for example, if the customer changes their address), but it is doubtful that the entry would be changed often.

However, it is quite conceivable that users of the database would need to access the database often, to obtain a copy of the address. Therefore, in many situations, the user would read from the database more often than they would write to the database.

It becomes important to determine whether the extra cost of writing to the database is offset by the time saved when reading from the database, to thereby determine whether an embodiment of the present invention will provide a benefit over time.

In a seventh aspect, the present invention provides a method for determining a critical read/write ratio for a database, comprising the steps of:

obtaining data with regard to the time taken to perform a read operation and a write operation on a first implementation of the database;

obtaining data with regard to the time taken to perform a read operation and a write operation on a second implementation of the database;

calculating a read time difference between the time taken to perform a read operation on a first implementation of a database and a second implementation of a database;

calculating a write time difference between the time taken to perform a write operation on a first implementation of a database and a second implementation of a database; and calculating the ratio between the read time difference and the write time difference to determine the critical read/write ratio for the database.

Preferably, the first implementation of a database comprises at least one set of linked entities.

Preferably, the second implementation of a database comprises an aggregation of all data values stored in the at least one set of linked entities.

Preferably, the method comprises the further step of comparing the critical read/write ratio for the database to an actual read/write ratio for the database, whereby the efficacy of implementing an embodiment of the present is determined.

Once the critical read/write ratio is determined, this value may be compared to the actual read/write ratio for a particular computing system to determine whether a method in accordance with a first, second or third aspect of the present invention may provide a benefit.

Generally, any performance benefit is maximised in a situation where the additional table aggregates the data from a deeply nested set of nesting entities that would otherwise require an expensive join to consolidate. In addition, performance is maximised where the ratio of the number of read operations to the number of write operations (read/write ratio) is high.

In an eighth aspect, the present invention provides a computer program arranged, when loaded on a computing system, to implement the method of a first aspect of the invention.

In a ninth aspect, the present invention provides a computer readable medium providing a computer program in accordance with an eighth aspect of the invention.

In a tenth aspect, the present invention provides a computer program arranged, when loaded on a computing system, to implement the method of a second aspect of the invention.

In an eleventh aspect, the present invention provides a computer readable medium providing a computer program in accordance with a tenth aspect of the invention.

In a twelfth aspect, the present invention provides a computer program arranged, when loaded on a computing system, to implement the method of a third aspect of the invention.

In a thirteenth aspect, the present invention provides a computer readable medium providing a computer program in accordance with an twelfth aspect of the invention.

BRIEF DESCRIPTION OF THE DRAWINGS

Features and advantages of the present invention will become apparent from the following description of an embodiment thereof, by way of example only, with reference to the accompanying drawings, in which.

DESCRIPTION OF THE PREFERRED EMBODIMENT

Figure 1:
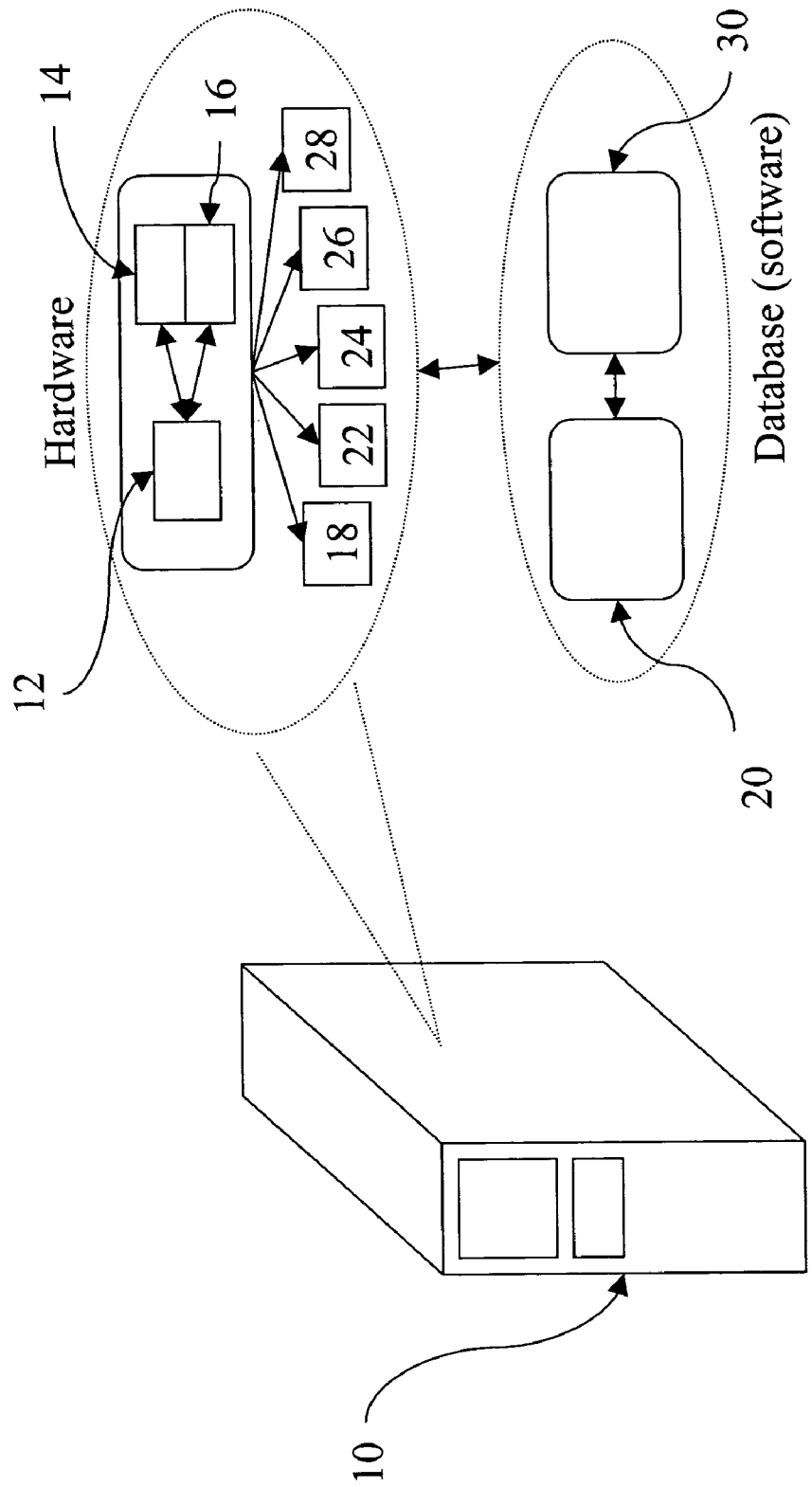
FIG. 1 illustrates a system for implementation of an embodiment of the present invention.

At FIG. 1 there is shown a schematic diagram of a computing system 10 suitable for use with an embodiment of the present invention. The computing system 10 may be used to execute applications and/or system services such as deployment services in accordance with an embodiment of the present invention. The computing system 10 preferably comprises a processor 12, read-only memory (ROM) 14, random access memory (RAM) 16, and input/output devices such as disk drives 18, keyboard 22, mouse 24, display 26, and printer 28. The computer includes programs that may be stored in RAM 16, ROM 14, or disk drives 18 and may be executed by the processor 12. Disk drives 18 may include any suitable storage media, such as, for example, floppy disk drives, hard disk drives, CD ROM drives or magnetic tape drives. The computing system 10 may use a single disk drive 18 or multiple disk drives. The computing system 10 may use any suitable operating system 20, such as Windows™ or Unix™. The computing system contains a database 30, which is arranged in accordance with an embodiment of the present invention.

It will be understood that the computing system described in the preceding paragraphs is illustrative only, and that an embodiment of the present invention may be executed on any suitable computing system, with any suitable hardware and/or software.

Figure 2:
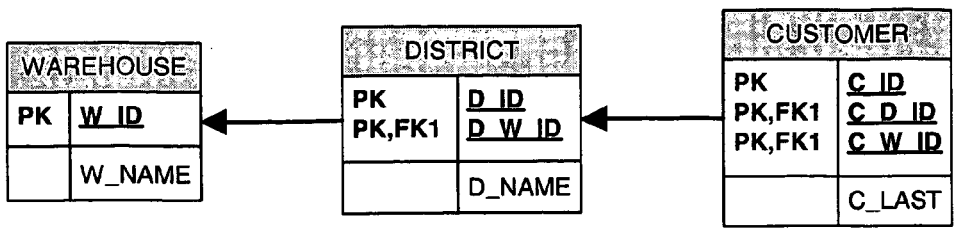
FIG. 2 is a simplified example of a known database schema.

An embodiment of the invention will now be described, by way of example, with reference to a simplified, yet typical relational database schema presented in FIG. 2.

In this example, the relational database contains three tables, namely "WAREHOUSE", "DISTRICT" and "CUSTOMER"—each table represents an "entity".

The WAREHOUSE table contains the columns, "W_ID" which contains a data value for the warehouse ID and "W_NAME", which contains the data value of the name of the warehouse. The primary key (PK) on the WAREHOUSE table is (W_ID). The primary key is an identifier commonly used in database systems to identify the individual entities whose data is contained in the table.

The DISTRICT table contains three columns, namely "D_ID" which holds the data value which corresponds to the district ID, D_W_ID, which holds the data value which corresponds to the ID of the warehouse servicing this district, and D_NAME, which holds the data value which corresponds to the name of the district. The primary key on the DISTRICT table is (D_W_ID, D_ID). The DISTRICT table contains a foreign key (D_W_ID) that references the primary key in the WAREHOUSE table. This acts as a "link" between the DISTRICT table and the WAREHOUSE table.

The CUSTOMER table contains "C_ID", which holds the customer ID value, "C_D_ID" which holds the ID of the district in which the customer resides, "C_W_ID", which holds the ID of the warehouse servicing the district in which the customer resides and "C_LAST", which holds the customer's last name. The primary key on the CUSTOMER table is (C_W_ID, C_D_ID, C_ID).

The CUSTOMER table contains a foreign key (C_W_ID, C_D_ID) that references the primary key in the DISTRICT table (note that the abbreviation 'FK' is used hereinafter to denote the term "foreign key").

This schema has been simplified from a "real-life" application schema in order to illustrate an example of an embodiment of the present invention. It will be understood that this simplified example is given for clarity purposes alone. In many real-life implementations of a relational database, the tables would contain more data about the entities they represent (for example, the CUSTOMER table would contain at least the customer's full name—not only the last name, as in the present example).

As is implied by the names given to the tables, the tables may be used to store information about the entities that they represent. The WAREHOUSE table stores information about a company's warehouses. The DISTRICT table stores information about the districts that a company services. The CUSTOMER table stores information about a company's customers.

In other words, there is shown a simplified database schema that may be used by a company to keep track of its warehouses, districts and customers. The database schema is generally accessed by a database access application, which is capable of writing to the database, and reading from the database.

At various times, new entries will be added to the table, existing entries will be updated, and entries that are no longer needed will be deleted. These operations are collectively called "write" operations, as they modify the state of the database (i.e. they modify the information contained within the database).

In addition to the write operations, in the normal course of running a database access application, the data in the tables will also be queried to find out current information about the company's warehouses, districts, and customers. Database queries are also known as "read" operations. (i.e. these operations do not alter the database, they merely retrieve information from the database).

Read operations are generally much more common than write operations because it is usual to write data to the database once, and subsequently read the data many times.

Using the above schema, if the user of the database access application wishes to determine the appropriate district for a particular customer, and subsequently wishes to determine which warehouse services that district, the following steps are generally undertaken:

1. The primary key on the CUSTOMER table is used to look up the desired customer's ID, giving the customer's last name (in the C_LAST column).
2. The foreign key on the CUSTOMER table is used to look up the primary key on the DISTRICT table, giving the district's name (in the D_NAME column).
3. The foreign key on the DISTRICT table is used to look up the primary key on the WAREHOUSE table, giving the warehouse's name (in the W_NAME column).

In practice, the above operation is generally carried out by the database access application upon the submission of a query which specifies which data the user wishes to access. The aforementioned operation is known in the art as a "join" operation, as it joins the data requested by the query from several disparate tables into one final result.

A join operation is generally computationally expensive. The sequence of lookups needed to complete a join operation, as outlined above, take a longer read time to complete than a single table lookup. Furthermore, deeply-nested relationships typically have very long read times since many join operations must be performed.

Figure 3:
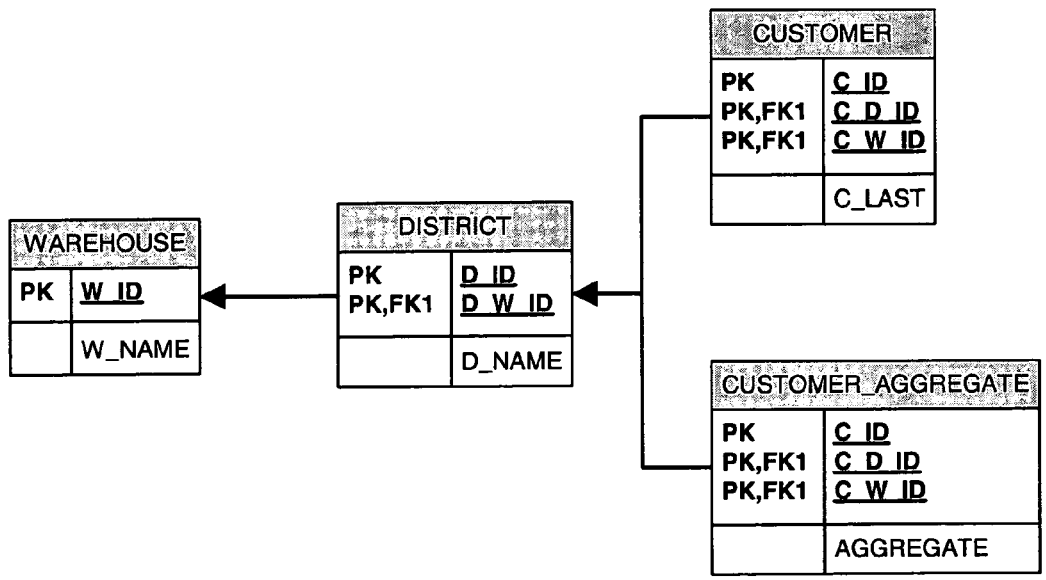
FIG. 3 is a simplified example of a database schema in accordance with an embodiment of the present invention.

An embodiment of the present invention ameliorates this problem by creating an additional table that aggregates all of the pertinent information about an entity—in this example, the customer. FIG. 3 shows the database schema from FIG. 2, modified by the addition of an additional entity, the additional entity being arranged to store the aggregation of the set of linked entities.

The additional CUSTOMER_AGGREGATE table contains "C_ID", the customer ID, "C_D_ID", the ID of the district in which the customer resides, "C_W_ID", the ID of the warehouse servicing the district in which the customer resides, and "AGGREGATE" which is a aggregation of the W_NAME, D_NAME, and C_LAST columns from the WAREHOUSE, DISTRICT, and CUSTOMER tables.

The primary key on the CUSTOMER_AGGREGATE table is (C_W_ID, C_D_ID, C_ID)—the same as on the CUSTOMER table.

The CUSTOMER_AGGREGATE table contains a foreign key (C_W_ID, C_D_ID) that references the primary key in the DISTRICT table—the same as on the CUSTOMER table.

A portion of the information in the AGGREGATE column is the same as would be contained in the C_LAST column—the customer's last name. However, in addition to this information, the AGGREGATE column also contains the district the customer belongs to (otherwise found in D_NAME), and the warehouse that services this district (otherwise found in W_NAME). There are many possible ways the information may be stored. Appropriate formats will include XML, a comma-separated list of strings, a bitmap of the in-memory object representing the customer, a persistent COM object, or a serialized Java object. It will be understood that a person skilled in the art would be capable of devising an appropriate format to store the data.

The data from the various nesting levels forms one conceptual entity. In this case, the data from the WAREHOUSE, DISTRICT, and CUSTOMER tables forms the customer entity. The customer entity contains all of the information pertinent to a customer—thus not just the information about the customer, but information regarding the customer's district, and the warehouse that services that district. In a normal application, the information about the customer entity is dispersed across multiple tables that need to be joined if all of the information about the entity is to be brought together. In an embodiment of the present invention, the aggregated column aggregates all of the information about one conceptual entity into one table, thus obviating the need for a join operation.

When the user of the application wishes to find out which district a particular customer belongs to, and which warehouse services that district, the primary key on the CUSTOMER_AGGREGATE table can be used to look up the desired customer's ID, giving all of the desired information without requiring a join operation. The elimination of the need for a join operation significantly reduces the amount of time required to retrieve the necessary information, and thus increases application performance.

However, there is an associated cost with performing this operation. Firstly, there is the increased write time, as additional time is required to write the aggregated data to the additional table. Secondly, additional disk space is required to store the additional table. Therefore, an embodiment of the present invention is not appropriate for every situation.

In order to assess whether there is any advantage to be gained by employing an embodiment of the present invention in an particular case, it is preferable that performance measurements be carried out to ascertain whether a benefit is derived from employing an embodiment of the present invention.

Generally, any performance benefit is maximised in a situation where the additional table aggregates the data from a deeply nested set of entities that would otherwise require an expensive join to consolidate. In addition, performance is maximised where the ratio of the number of read operations to the number of write operations (read/write ratio) is high.

The read/write ratio for a set of entities must be greater than a certain critical amount. This critical amount is termed the "Critical Read/Write Ratio."The Critical Read/Write Ratio for an entity may be calculated, in one embodiment of the present invention, as follows:
1. The average time taken for a write operation to the tables making up the entity is measured, without considering the additional time taken to write to the aggregated table—this variable is denoted by the symbol $t_w$.
2. The average time taken for a write operation to the tables making up the entity, including the additional aggregating table is measured—this variable is denoted by the symbol $t_{w,agg}$.
3. The average time taken for a join operation from the tables making up the entity (ie. not the aggregating table) is measured—this variable is denoted by the symbol $t_r$.
4. The average time taken for a read operation from the table aggregating the entity is measured—this variable is denoted by the symbol $t_{r,agg}$.
5. The extra time spent per write operation writing to the aggregating table ($t_+$) is calculated, using the formula: $t_+ = t_{w,agg} - t_w$
6. The time saved per read operation reading from the aggregating table ($t_-$) is calculated, using the formula: $t_- = t_r - t_{r,agg}$
7. The Critical Read/Write Ratio ($C_{RW}$) is calculated, using the formula: $C_{RW} = t_+ / t_-$ The Critical Read/Write Ratio ($C_{RW}$) provides the ratio of the average number of reads from the entity that are needed for each write to the entity. Using this ratio, a user can determine whether the implementation of an embodiment of the present invention would result in a performance increase. That is, if the average number of reads from the entity for each write to the entity is greater than $C_{RW}$, it is worth-while to implement this scheme for the database. In addition, the greater the read/write ratio is above and beyond $C_{RW}$, the greater the benefit.

A prototype of the three-level customer entity depicted in FIG. 3 was implemented and tested inside a Microsoft SQL Server database running on a standard Intel Pentium III 1 GHz PC running Microsoft Windows XP. The following example should not be construed as being indicative of anything other than a demonstration of the merits of an embodiment of the invention.

The specific timings gathered for any application are generally a function of variable such as the system hardware, system software, database software, application software, the database schema, current and historic data access patterns (including parameters such as the read/write ratio, the specific types of write operations carried out, and the specific types of queries executed), the nesting levels of entities within the database, and current load.

Since all of the abovementioned parameters are specific to each particular deployment of an application, the extrapolation of the results given herein, to another application, may not be valid.

To estimate whether an embodiment of the present invention provides any advantage, a benchmark was carried out to gather the data necessary to calculate the Critical Read/Write Ratio, and once calculated, the critical Read/Write Ratio was used to gauge whether the actual read/write ratio exceeds the critical value.

The Benchmark was Setup as Follows:
A database schema was created in accordance with the embodiment of the present invention shown in FIG. 3.
The tables in the database were populated with the following elements:
The WAREHOUSE table was populated with 2 warehouses.
The DISTRICT table was populated with 20 districts (10 per warehouse).
The CUSTOMER table was populated with 96,000 customers (4,800 per district).
The CUSTOMER_AGGREGATE table was populated with 96,000 entries containing all of the information relating to the customer entity.
The time taken to populate all of the tables (not including the CUSTOMER_AGGREGATE table) was measured.
The time taken to populate all of the tables (including the CUSTOMER_AGGREGATE table) was measured.
The time taken to join the WAREHOUSE, DISTRICT, and CUSTOMER tables, and read out all of the entries in sorted order, according to the primary key on the CUSTOMER table, was measured.
The time taken to read out all of the entries from the CUSTOMER_AGGREGATE table in sorted order according to the primary key on the CUSTOMER_AGGREGATE table was measured.
All measurements were averaged over five runs.

The Timings Were:

Time Taken to Populate the WAREHOUSE, DISTRICT, and CUSTOMER Tables:

$t_w = 22,787$ ms

Time Taken to Populate the WAREHOUSE, DISTRICT, CUSTOMER, and CUSTOMER_AGGREGATE Tables:

$t_{w,agg} = 47,334$ ms

Time Taken to Join the WAREHOUSE, DISTRICT, and CUSTOMER Tables:

$t_r = 841$ ms

Time Taken to Read the Same Data From the CUSTOMER_AGGREGATE Table:

$t_{r,agg} = 643$ ms

Extra Time Spent Writing to the CUSTOMER_AGGREGATE Table:

$t_+ = t_{w,agg} - t_w = (47,334 - 22,787)$ms $= 24,547$ ms

Time Saved Reading From the CUSTOMER_AGGREGATE Table:

$t_- = t_r - t_{r,agg} = (841 - 643)$ms $= 198$ ms

Critical Read/Write Ratio:

$C_{RW} = t_+/t_- = 24,547/198 = 124:1$

Thus, implementing an embodiment of the present invention, in the circumstances hereinbefore described, would provide an advantage if the number of read operations is 124 or more times greater than the number of write operations.

Figure 4:
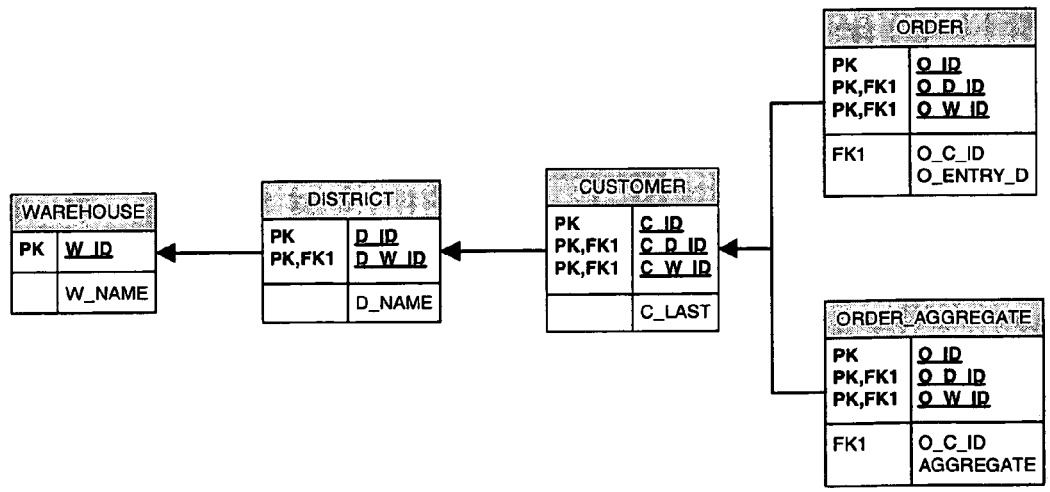
FIG. 4 is a simplified example of a database schema in accordance with an embodiment of the present invention.

To determine whether the benefits gained from an embodiment of the present invention increase as the number of nesting levels for an entity increases, the applicant also performed a benchmark where the database was populated with four nesting levels. The entity prototyped in this example is the order entity, with the database schema shown in FIG. 4.

The Prototype was Setup as Follows:
The database schema was created as in FIG. 4.
The tables were populated as follows:
The WAREHOUSE table was populated with 2 warehouses.
The DISTRICT table was populated with 20 districts (10 per warehouse).
The CUSTOMER table was populated with 4,800 customers (240 per district).
The ORDER table was populated with 96,000 orders (20 per customer).
The ORDER_AGGREGATE table was populated with 96,000 entries containing all of the information relating to the order entity.
The time taken to populate all of the tables except the ORDER_AGGREGATE table was measured.
The time taken to populate all of the tables including the ORDER_AGGREGATE table was measured.
The time taken to join the WAREHOUSE, DISTRICT, CUSTOMER, and ORDER tables, and read out all of the entries in sorted order according to the primary key on the ORDER table was measured.
The time taken to read out all of the entries from the ORDER_AGGREGATE table in sorted order according to the primary key on the ORDER_AGGREGATE table was measured.
All measurements were averaged over five runs.

The Timings Were:

Time Taken to Populate the WAREHOUSE, DISTRICT, CUSTOMER, and ORDER Tables:

$t_w = 22,588$ ms

Time Taken to Populate the WAREHOUSE, DISTRICT, CUSTOMER, ORDER, and ORDER_AGGREGATE Tables:

$t_{w,agg} = 47,378$ ms

Time Taken to Join the WAREHOUSE, DISTRICT, CUSTOMER, and ORDER Tables:

$t_r = 3,481$ ms

Time Taken to Read the Same Data From the ORDER_AGGREGATE Table:

$t_{r,agg} = 713$ ms

Extra Time Spent Writing to the ORDER_AGGREGATE Table:

$t_+ = t_{w,agg} - t_w = (47,378 - 22,588)$ms $= 24,790$ ms

Time Saved Reading From the CUSTOMER_AGGREGATE Table:

$t_- = t_r - t_{r,agg} = (3,481 - 713)$ms $= 2,768$ ms

Critical Read/Write Ratio:

$C_{RW} = t_+/t_- = 24,790/2,768 = 9:1$

Thus, increasing the number of nesting levels from three to four dramatically reduced the Critical Read/Write Ratio from 124:1 to 9:1. For most real life entities, such a low Critical Read/Write Ratio would make it worthwhile to implement a method in accordance with an embodiment of the present invention for the database (assuming the benefit outweighed the cost of the extra disk space needed to maintain the extra table).

Therefore, the examples described in the preceding paragraphs illustrate that the advantage provided by an embodiment of the present invention is related to the depth of the level of nesting of entities in the database.

The most deeply nested entities are found in relational databases acting as persistent stores for runtime entities using an object-relational mapping. In such situations, the entities may be nested many levels deep, and great benefit can be derived from an embodiment of the present invention.

It should be noted that in performing the examples described in the preceding paragraphs, the applicant became aware of a "caching" effect. When joining tables on Microsoft SQL Server, the first time a join is performed, the average time taken was approximately twice as long as subsequent join operations. Thus a caching effect was evident. No such effect was observed for the aggregating tables. The applicant postulates that joining tables, (on Microsoft SQL Server and other relational databases with a similar caching strategy), is more sensitive to caching effects than aggregating the data into one table.

As the measurements reported above were averaged over five iterations, (ignoring the outliers, the outliers being the first accesses on the join query, which took approximately twice as long to complete as the subsequent accesses), it is likely that, on average, less of the data would have been available in the cache and the join example would have been even more time costly. This is premised on the assumption that a large real-life database with random table access is typical in a real-life situation. In such a situation, less of the data would have been available in the cache and the join example would have been even more costly. Thus, an embodiment of the present invention may provide performance increases beyond those enumerated in the above examples.

It will be understood that whilst the present invention has been described with reference to the provision of one reference table, other embodiments of the invention may contain a plurality of aggregate tables, as may be required in certain circumstances. The addition of further aggregate tables may facilitate different types of database queries.

Described herein has been a method for determining the value of developing and using additional aggregate tables to supplement the joining operations in a Relational Database when the ratio of read operations to write operations is a high value ratio.

The invention claimed is:

1. A method operative in a computer system for improving the performance of a database by determining whether or not to alter the fields of the database, having entities which hold a set of data values, said database including at least one set of linked entities, wherein the at least one set of linked entities contains a plurality of conceptual entities, each of the conceptual entities including a plurality of data values which are distributed amongst the plurality of the conceptual entities, comprising the steps of:
 (i) determining an average read/write ratio of the plurality of data values distributed amongst the at least one set of linked entities in the database;
 (ii) comparing the average read/write ratio of the database to a predetermined critical read/write ratio, so that said predetermined critical read/write ratio is calculated by carrying out the following steps:
  (iia) providing data with regard to the time taken to perform a read operation and a write operation on a first implementation of the said database wherein said first implementation of a database comprises at least one set of linked entities;
  (iib) providing data with regard to the time taken to perform a read operation and a write operation on a second implementation of the said database wherein the second implementation of the database comprises an aggregation of all data values stored in the at least one set of the linked entities;
  (iic) calculating a read time difference between the time taken to perform a read operation on said first implementation of said database and on said second implementation of said database;
  (iid) calculating a write time difference between the time taken to perform a write operation on said first implementation of said database and on said second implementation of said database; and
  (iie) calculating the ratio between the read time difference and the write time difference to determine the critical read/write ratio for the database; and
 (iii) if the average read/write ratio is greater than the critical read/write ratio, then performing the following method steps:
  (iiia) defining an additional entity table in the database; and
  (iiib) storing in the additional entity table an aggregation of said plurality of data values representing an aggregation of at least one of the plurality of conceptual entities, whereby the information defining the conceptual entity is obtained by performing a single read operation on the additional entity table;
 (iv) altering the fields of the database when said average read/write ratio is greater than said critical read/write ratio.

2. A method operating in a computer system using a CPU, memory, I/O unit and database on disk for modifying a database by determining whether or not to alter the fields of the database having entities which hold a set of data values, comprising:
 (a) providing at least one set of linked entities, in the said database, wherein the said at least one set of linked entities contains a plurality of conceptual entities, each of the conceptual entities including a plurality of data values which are distributed amongst the plurality of conceptual entities;
 (b) determining an average read/write ratio of the plurality of data values distributed amongst the at least one set of linked entities in the database;
 (c) comparing the average read/write ratio of the database to a predetermined critical read/write ratio, including establishing a predetermined critical read/write ratio, wherein said establishing of said predetermined critical read/write ratio further includes the steps of:
  (ca) providing data with regard to the time taken to perform a read operation and a write operation on the data values which are distributed amongst the plurality of entities;
  (cb) providing data with regard to the time taken to perform a read operation and a write operation on said additional entity table;
  (cc) calculating a read time difference between the time taken to perform a read operation on the data values which are distributed amongst the plurality of entities and on said additional entity table;
  (cd) calculating a write time difference between the time taken to perform a write operation on the data values which are distributed amongst the plurality of entities and on said additional entity table;

(ce) calculating the ratio between said read time difference and said write time difference to determine the critical read/write ratio for the database; and (cf) not modifying said database when said average read/write ratio is less than said critical read/write ratio;

(d) if the average read/write ratio is greater than the critical read/write ratio, to perform the steps of:

(d1) defining an additional entity table in addition to the at least one set of linked entities;

(d2) storing in said additional entity table, the aggregation of said plurality of data values representing an aggregation of at least one of said plurality of conceptual entities; and (d3) reading said aggregation of said plurality of data values by performing a single read operation on said additional entity table to return the information defining at least one conceptual entity; and (e) modifying the fields of the database when said average read/write ratio exceeds said critical read/write ratio.

3. An electronic machine holding a computer, memory means, and electronic database which utilizes a computer program for improving the performance of said database including at least one set of linked entities, wherein the at least one set of linked entities contains a plurality of conceptual entities, each of the conceptual entities including a plurality of data values which are distributed amongst the plurality of the conceptual entities, said computer program including at least one instruction which, when executed by a computer system, is arranged to carry out the following steps:

(i) determining an average read/write ratio of the plurality of data values distributed amongst the at least one set of linked entities in the database;

(ii) comparing the average read/write ratio of the database to a predetermined critical read/write ratio, the predetermined critical read/write ratio is calculated by carrying out the following steps:

(iia) providing data with regard to the time taken to perform a read operation and a write operation on a first implementation of the said database, wherein the first implementation of a database comprises at least one set of linked entities;

(iib) providing data with regard to the time taken to perform a read operation and a write operation on a second implementation of the said database wherein the second implementation of the database comprises an aggregation of all data values stored in the at least one set of the linked entities;

(iic) calculating a read time difference between the time taken to perform a read operation on said first implementation of said database and on said second implementation of said database;

(iid) calculating a write time difference between the time taken to perform a write operation on said first implementation of said database and on said second implementation of said database; and (iie) calculating the ratio between the read time difference and the write time difference to determine the critical read/write ratio for the database; and iii) if the average read/write ratio is greater than the critical read/write ratio, then performing the following steps:

(iiia) defining an additional entity table in the database; and (iiib) storing in the additional entity table an aggregation of said plurality of data values representing an aggregation of at least one of the plurality of conceptual entities, whereby the information defining the conceptual entity is obtained by performing a single read operation on the additional entity table.

* * * * *